(12) United States Patent
Gould et al.

(10) Patent No.: US 10,715,487 B2
(45) Date of Patent: *Jul. 14, 2020

(54) METHODS AND SYSTEMS FOR CREATING NEW DOMAINS

(71) Applicant: VERISIGN, INC., Reston, VA (US)

(72) Inventors: James Gould, Leesburg, VA (US); Paul Tidwell, Leesburg, VA (US); Ramana M Lavu, Ashburn, VA (US); Marc Anderson, Herndon, VA (US); Lambert Arians, Ashburn, VA (US)

(73) Assignee: VERISIGN, INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/023,440

(22) Filed: Jun. 29, 2018

(65) Prior Publication Data

US 2018/0309719 A1 Oct. 25, 2018

Related U.S. Application Data

(63) Continuation of application No. 13/339,466, filed on Dec. 29, 2011, now Pat. No. 10,015,134.

(51) Int. Cl.
*G06F 15/173* (2006.01)
*H04L 29/12* (2006.01)

(52) U.S. Cl.
CPC ........ *H04L 61/302* (2013.01); *H04L 61/1511* (2013.01)

(58) Field of Classification Search
CPC combination set(s) only.
See application file for complete search history.

(56) References Cited

U.S. PATENT DOCUMENTS

| | | | |
|---|---|---|---|
| 6,151,624 A | 11/2000 | Teare et al. | |
| 6,880,007 B1 | 4/2005 | Gardos et al. | |
| 6,895,430 B1 * | 5/2005 | Schneider | H04L 29/12009 707/999.005 |
| 7,000,028 B1 | 2/2006 | Broadhurst et al. | |
| 7,299,299 B2 | 11/2007 | Hollenbeck et al. | |
| 7,490,124 B2 | 2/2009 | King et al. | |
| 7,805,379 B1 * | 9/2010 | Adkins | G06Q 30/0645 705/307 |
| 7,895,656 B1 * | 2/2011 | Brock | G06F 21/564 713/188 |
| 7,987,251 B2 | 7/2011 | Blinn et al. | |

(Continued)

OTHER PUBLICATIONS

Chen et al., "Managing Semantic Metadata for Web Grid Services", International Journal of Web Services Research, v 3, n 4, Oct.-Dec. 2006, pp. 73-94.

(Continued)

*Primary Examiner* — Philip J Chea
*Assistant Examiner* — Wuji Chen
(74) *Attorney, Agent, or Firm* — MH2 Technology Law Group, LLP

(57) ABSTRACT

Systems and methods for creating a new domain, such as a top-level domain or a second-level domain, make use of a Domain Manager that enables a user to enter data that is necessary or optional to implement the creation of a new domain. Systems such as, for example, a Registry and one or more Registrars, may use the data defined by the Domain Manager to create a new domain.

23 Claims, 12 Drawing Sheets

(56) References Cited

U.S. PATENT DOCUMENTS

| | | | | |
|---|---|---|---|---|
| 8,195,652 | B1* | 6/2012 | Parsons | G06Q 30/0207 707/723 |
| 2002/0103820 | A1* | 8/2002 | Cartmell | G06F 17/273 715/260 |
| 2002/0138649 | A1* | 9/2002 | Cartmell | H04L 29/06 709/245 |
| 2002/0143913 | A1 | 10/2002 | Sahita et al. | |
| 2002/0173981 | A1* | 11/2002 | Stewart | G06Q 30/02 705/1.1 |
| 2003/0065784 | A1 | 4/2003 | Herrod | |
| 2004/0199493 | A1* | 10/2004 | Ruiz | G06Q 30/06 |
| 2004/0199608 | A1* | 10/2004 | Rechterman | G06Q 10/10 709/220 |
| 2004/0199620 | A1* | 10/2004 | Ruiz | H04L 29/12009 709/223 |
| 2005/0172031 | A1* | 8/2005 | Adelman | G06Q 30/0241 709/245 |
| 2005/0210149 | A1* | 9/2005 | Kimball | H04L 29/12009 709/245 |
| 2006/0101155 | A1* | 5/2006 | Damour | G06Q 30/02 709/238 |
| 2006/0218289 | A1* | 9/2006 | Assad | H04L 29/12122 709/229 |
| 2006/0230380 | A1* | 10/2006 | Holmes | H04L 29/12594 717/117 |
| 2007/0143427 | A1* | 6/2007 | Tischer | H04L 29/12122 709/206 |
| 2007/0180056 | A1* | 8/2007 | Assad | H04L 29/12594 709/217 |
| 2008/0005127 | A1* | 1/2008 | Schneider | H04L 29/12594 |
| 2008/0235383 | A1 | 9/2008 | Schneider | |
| 2008/0289029 | A1 | 11/2008 | Kim | |
| 2009/0055542 | A1 | 2/2009 | Zhao | |
| 2009/0063690 | A1 | 3/2009 | Verthein | |
| 2010/0011139 | A1 | 1/2010 | Wang et al. | |
| 2010/0036946 | A1* | 2/2010 | von Arx | H04L 29/12594 709/225 |
| 2010/0299410 | A1* | 11/2010 | Cartmell | H04L 29/12009 709/219 |
| 2010/0299450 | A1* | 11/2010 | Mendell | H04L 29/12066 709/238 |
| 2011/0047292 | A1 | 2/2011 | Gould et al. | |
| 2011/0055627 | A1 | 3/2011 | Zawacki | |
| 2012/0030102 | A1* | 2/2012 | Doehler | G06Q 20/10 705/40 |
| 2012/0117095 | A1* | 5/2012 | Chavvakula | H04L 29/12632 707/758 |
| 2012/0173565 | A1* | 7/2012 | Jacobs | G06F 16/951 707/769 |
| 2012/0304004 | A1* | 11/2012 | Gould | H04L 61/1511 714/15 |
| 2013/0173497 | A1* | 7/2013 | Gould | H04L 61/302 705/400 |
| 2013/0282797 | A1* | 10/2013 | Carls | H04L 67/10 709/203 |
| 2014/0135105 | A1 | 5/2014 | Quan | |
| 2014/0280849 | A1* | 9/2014 | Aras | H04L 61/302 709/223 |

OTHER PUBLICATIONS

Taswell, "The Hierarchically Distributed Mobile Metadata (HDMM) Style of Architecture for Pervasive Metadata Networks", 10th International Symposium on Pervasive Systems, Algorithms, and Networks, 2009, pp. 315-320.

Extended European Search Report dated May 7, 2013, European Application No. 12197268.1, filed Dec. 29, 2011, pp. 1-5.

Communication Pursuant to Article 94(3) EPC dated Jul. 27, 2017, European Application No. 12197268.1, pp. 1-6.

S. Hollenbeck, "Extensible Provisioning Protocol (EPP) Host Mapping", RFC 5732, Internet Engineering Task Force (IETF), Aug. 2009, pp. 1-29.

S. Hollenbeck, "Extensible Provisioning Protocol (EPP) Domain Name Mapping", RFC 5731, Internet Engineering Task Force (IETF), Aug. 2009, pp. 1-44.

Gould et al., "Registry Mapping for the Extensible Provisioning Protocol (EPP)", VeriSign, Inc., Jan. 10, 2014, pp. 1-43.

Hollenbeck et al., "Extensions for the Extensible Provisioning Protocol (EPP)", RFC 7451, Mar. 7, 2018, pp. 1-3.

Matthew Ward, "Registry Mapping for the Extensible Provisioning Protocol (EPP)", IPR Disclosure, Internet Draft, VeriSign, Inc., Mar. 18, 2015, pp. 1-2.

Gould et al., "Registry Mapping for the Extensible Provisioning Protocol (EPP)", VeriSign, Inc., Jun. 27, 2018, pp. 1-63.

Matthew Ward, "Registry Mapping for the Extensible Provisioning Protocol (EPP)", IPR Disclosure, Internet Draft, VeriSign, Inc., May 31, 2018, pp. 1-3.

Galvin et al., 6. REGEXT mailing list messages associated with the "Registry Mapping for the Extensible Provisioning Protocol (EPP)" Internet Draft, Jun. 2018, 1 page.

Extended European Search Report issued in corresponding European patent application No. 19164372.5 dated Jul. 8, 2019, pp. 1-8.

* cited by examiner

|  | TLD NAME | PRODUCT PREFIX | STATUS |
|---|---|---|---|
| ▷ | INT1208 | DOTINT1208 | Waiting for key signing |
| ▷ | IDN | IDN | done |
| ▷ | FOOR.BAR | DOTFOOBAR | Waiting for key signing |
| ▷ | VAN | DOTVAN | done |
| ▷ | PUMA | DOTPUMA | Waiting for key signing |
| ▷ | NIKE | DOTNIKE | done |
| ▷ | TEST1201 | DOTTEST1201 | Waiting for key signing |

Add a new TLD — 510

CREATE TLD

TLD Name: [ ]
Product Prefix: [ ]
DNSSEC Support: (NSEC3-OPTOUT ⇕)
DNSSEC Algorithm: ⦿ RSA/SHA-256   ○ RSA/SHA-512
Thick Whois support: ⦿ Yes   ○ No
Whois Port Number: [0]
Optional TLD Features: ☐ PREMIUM
☐ PENDING_CREATE Create TLD — 1510

FIG. 15

METHODS AND SYSTEMS FOR CREATING NEW DOMAINS

RELATED APPLICATION

This application is a continuation of U.S. patent application Ser. No. 13/339,466 filed Dec. 29, 2011, entitled "METHODS AND SYSTEMS FOR CREATING NEW DOMAINS", which is incorporated herein by reference.

TECHNICAL FIELD

This application is directed towards methods and systems for creation of new domains, including the creation of new top level domains and new second level domains.

BACKGROUND

A domain name system (DNS) allows people using the internet to refer to domain names, rather than IP addresses, when accessing websites and other online services. Domain names, which employ text characters, such as letters, numbers, and hyphens, will often be easier to remember than IP addresses, which are numerical and do not contain letters or hyphens. In order to implement a DNS, a variety of top-level domains (TLDs) have been created. A generic top-level domain (gTLD) is one type of top-level domain used in DNS. Examples of gTLDs that have already been created are ".com," ".net," and ".org." Another type of TLD is a country-code top-level domain (ccTLD) such as, for example, ".uk."

One or more second-level domains (SLDs) can be registered under a TLD. For example, a SLD of "verisign" could be registered under the TLD ".com" such that a website could be accessed at "verisign.com."

A domain name "Registry" is an entity that creates, that is, "registers" TLDs, and stores data regarding TLDs and SLDs to be registered under the respective TLDs. A Registry may make stored data regarding TLDs available to one or more "Registrars." A Registrar may receive data from customers desiring to register one or more SLDs under a given TLD and may communicate this data to the Registry for storage.

The creation and administration of a new TLD or a new SLD requires several changes to be made at a Registry, at one or more Registrars, and at a variety of other services such as DNS servers and Whois. In order for a Registry to store data regarding TLDs and SLDs registered under the respective TLDs, data regarding a new TLD may need to be entered into a Registry. In addition, in order for a Registrar to register SLDs under TLDs, data regarding a new TLD may need to be provided to the Registrars. It is desirable to provide an improved method for performing the steps necessary to create a new TLD or a new SLD.

SUMMARY

In one disclosed embodiment, a computer-implemented method of creating a new domain is performed. The method includes receiving domain data regarding an unregistered domain at a first system, the domain data comprising a domain name and data defining at least one of: services to be supported by the domain, features to be supported by the domain, or policies to be enforced by the domain. The method further includes creating a data structure comprising the domain data. The method further includes transmitting the created data structure to a second system.

In another disclosed embodiment, a system for creating a new domain is provided. The system includes a processor, a memory, an input device, a data structure creation module, and a communication module. The input device is coupled to the processor to receive domain data regarding an unregistered domain, the domain data comprising a domain name and data defining at least one of: services to be supported by the domain, features to be supported by the domain, or policies to be enforced by the domain. The data structure creation module is coupled to the processor and provides for creating a data structure comprising the domain data. The communication module provides for transmitting the data structure to a second system.

In another disclosed embodiment, a system for creating a new domain is provided. The system includes a processor, a memory, a communication module, and one or more databases. The communication module is coupled to the processor and provides for receiving data from a first system regarding an unregistered domain that is being created as a new domain. The one or more databases provide for storing at least some of the received data, wherein the stored data comprises a domain name and data defining at least one of: services supported by the domain, features supported by the domain, or policies enforced by the domain.

Additional aspects related to the embodiments will be set forth in part in the description which follows, and in part will be obvious from the description, or may be learned by practice of the invention.

It is to be understood that both the foregoing general description and the following detailed description are exemplary and explanatory only and are not restrictive of the invention, as claimed.

BRIEF DESCRIPTION OF THE DRAWINGS

FIG. 5 is an example of a user interface of a Domain Manager according to one embodiment.

FIG. 15 is an example of a user interface of a Domain Manager according to one embodiment.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

The process of creating a new domain can be expedited by configuring the data flow in a system used to create a new domain. For instance, in some embodiments, a computer system in the form of a Domain Manager may be provided to obtain some or all of the data necessary to create and administer a new domain. Further, in some embodiments, a system, such as a Registry, that creates the new domain can be structured to accept data from the Domain Manager, store and use portions of the data, and transmit portions of the data to other systems.

Figure 1:
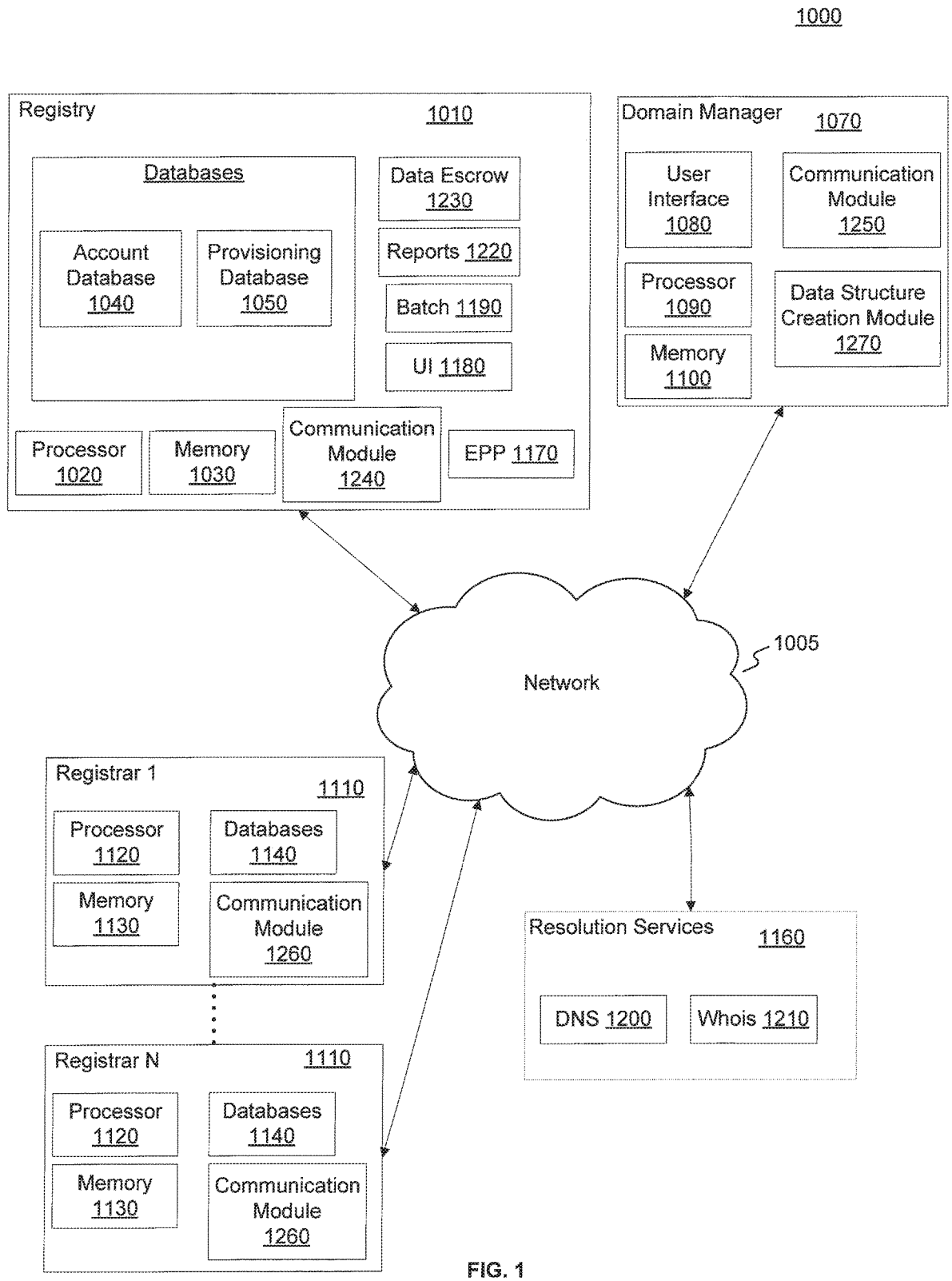
FIG. 1 illustrates a system in which one Registry and multiple Registrars are used when creating a new top-level domain.

FIG. 1 depicts a system 1000 in which one Registry 1010 and multiple Registrars 1110 are used when introducing a new top-level domain. An arrangement such as that disclosed in FIG. 1 may be used when a generic TLD is being created.

A network 1005, such as the internet or an intranet, may interconnect the Registry 1010, the Registrars 1110, a Domain Manager 1070, and the one or more Resolution Services 1160, to enable Registry 1010, the Registrars 1110, the Domain Manager 1070, and the one or more Resolution Services 1160 to communicate with each other.

The Registry 1010 may include one or more processors 1020, one or more memories 1030, and one or more databases, such as a NameStore Customer Console (NCC) database 1040 and a Consolidated Top Level Domain database 1050 (otherwise known as a Provisioning Database). The NCC database may include information regarding Accounts (Accounts may be associated with Registrars and/or Registry Internal Accounts), a product catalog (for example, one product per TLD), subscriptions from the Accounts to the products, security groups that are assigned to individual users, and aggregate financial information. The Registry 1010 may also include a Communication Module 1240 to facilitate transmitting data to, and receiving data from, systems external to the Registry. The Registry 1010 may also include EPP 1170, User Interface 1180, Batch 1190, Reports 1220, and Data Escrow server 1230. EPP 1170 may facilitate secure communications between the Registrars and the Registry. User Interface 1180 may allow a user to access components of the Registry. Batch 1190 may update the available credit of an Account and perform other asynchronous actions. Reports server 1220 may store reports having information regarding domains that have been registered, for use by various entities such as the Registry, Registrars, or ICANN. Data Escrow server 1230 may store reports having information regarding domains that have been registered and corresponding pricing information, for use by an escrow agent. The processor 1020 could be a server, a microprocessor, or any circuit capable of electrically coupling the components of the Registry. The Registry may operate in the manner described in any one of the embodiments below discussing the functions of the Registry.

A plurality of Registrars 1110 may include one or more processors 1120, one or more memories 1130, and one or more databases 1140. The Registrars 1110 may also include a Communication Module 1260 to facilitate transmitting data to, and receiving data from, systems external to the Registrars. The processor 1120 could be a server, a microprocessor, or any circuit capable of electrically coupling the one or more databases, the one or more memories, and the Communication Module. The Registrars may operate in the manner described in any one of the embodiments below discussing the functions of a Registrar.

A Domain Manager 1070 may be provided with one or more processors 1090, one or more memories 1100, and one or more user interfaces 1080. The Domain Manager 1070 may also include a Communication Module 1250 to facilitate transmitting data to, and receiving data from, systems external to the Domain Manager. The Domain Manager 1070 may also include a Data Structure Creation Module 1270 to facilitate creation of a data structure based on information acquired from the user interface 1080. The processor 1090 could be a PC, a microprocessor, or any circuit capable of electrically coupling the one or more user interfaces, the one or more memories, the Communication Module, and the Data Structure Creation Module. The Domain Manager may operate in the manner described in any one of the embodiments below discussing the functions of the Domain Manager. The Domain Manager 1070 is depicted in FIG. 1 as being a separate system that can be reached via network 1005, however, it is to be appreciated that the Domain Manager could also be located in the Registry 1010.

A plurality of Resolution Services 1160 may be provided. Resolution Services 1160 may include a DNS server 1200 and a Whois server 1210. The DNS server may store a mapping of domain names to IP addresses. The Whois server may store data regarding customers that have registered domain names.

Figure 2:
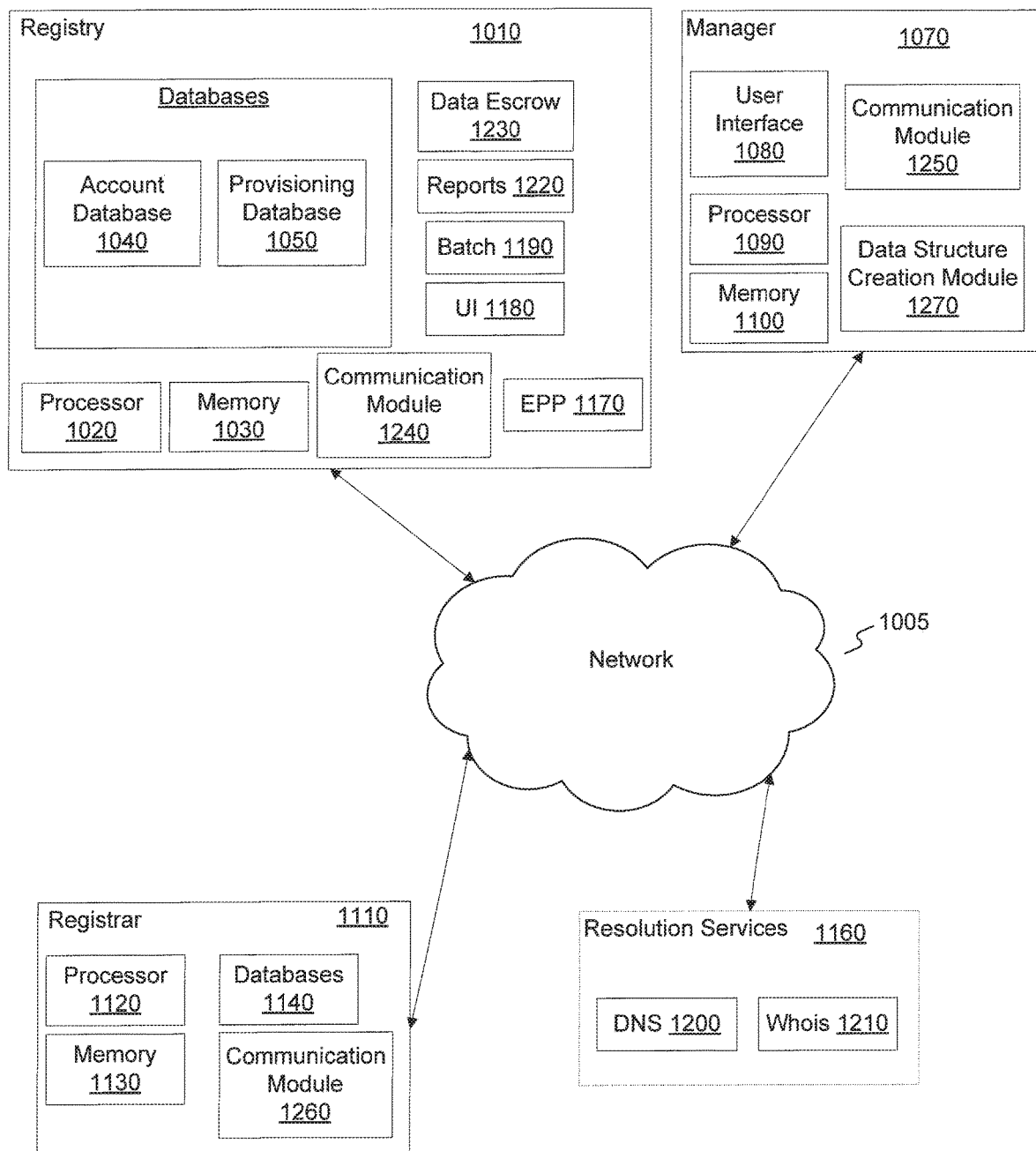
FIG. 2 illustrates a system in which one Registry and one Registrar are used when creating a new top-level domain.

FIG. 2 depicts a system 2000 for introducing a new top-level domain. The components of system 2000 operate in substantially the same manner as system 1000, but the system 2000 includes only a single Registry and a single Registrar. Whereas system 1000 may be used for introduction of, for example, gTLDs similar to ".com" and ".net," system 2000 may be used for introduction of, for example, "vanity" domains such as ".London."

Figure 3:
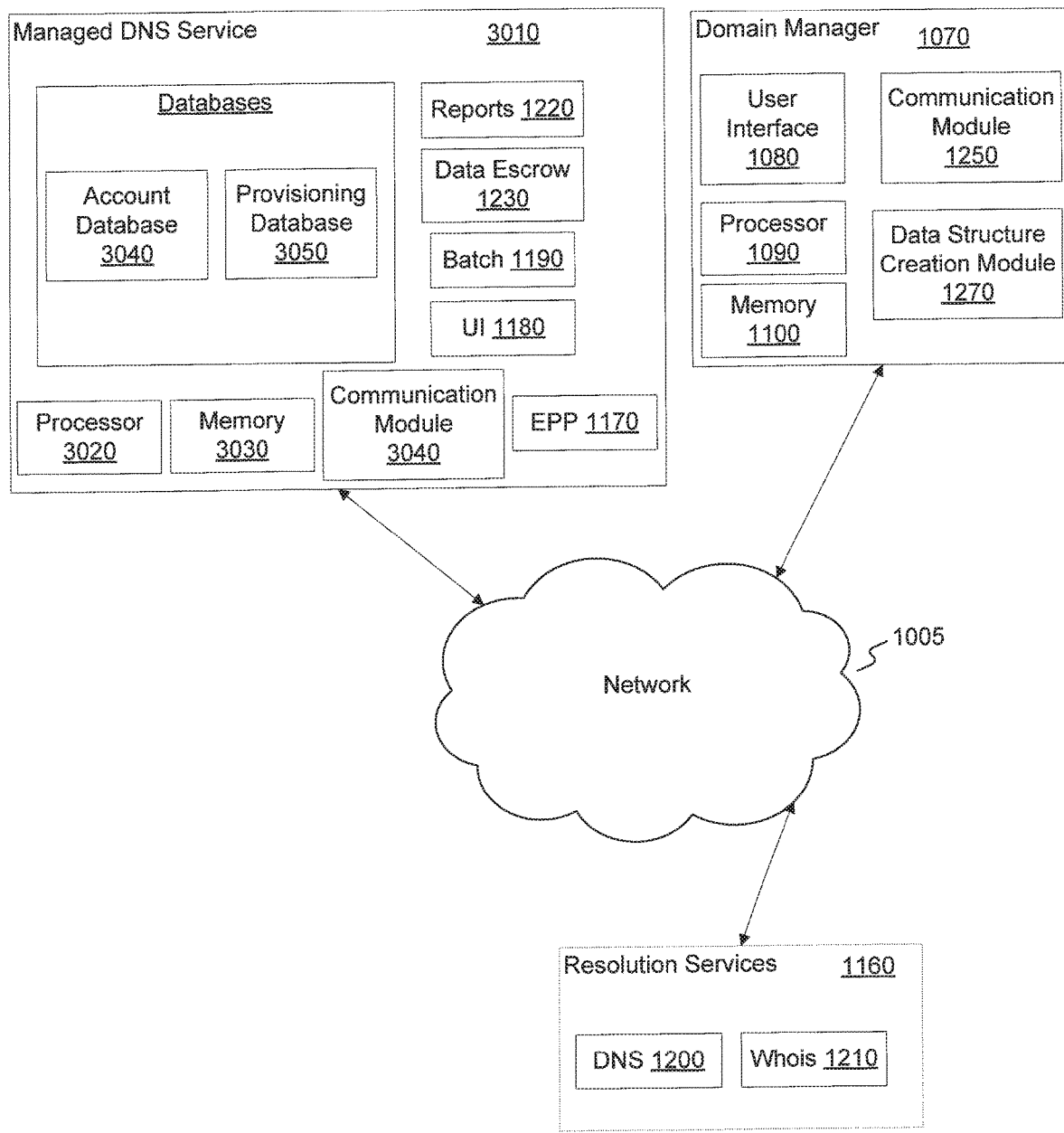
FIG. 3 illustrates a system in which a managed DNS service is used when creating a new top-level domain

FIG. 3 depicts a system 3000 in which a managed DNS service is used when introducing a new top-level domain. The components of system 3000 operate in substantially the same manner as system 1000. However, in the managed DNS service scenario, the managed DNS service assumes the role of both the Registry and the Registrar.

Figure 4:
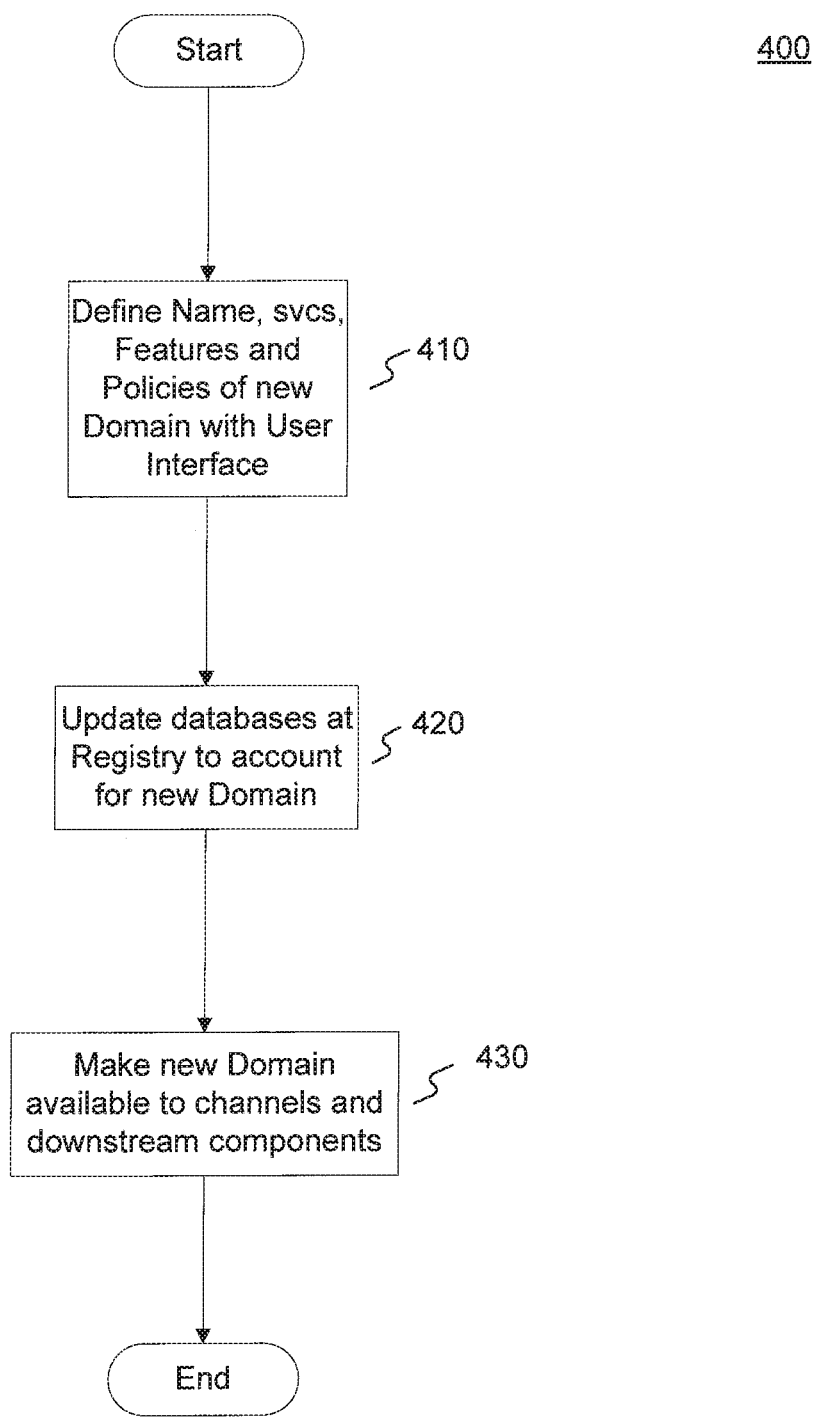
FIG. 4 is a flow chart of a registration method for a new domain according to one embodiment.

FIG. 4 depicts a registration method 400 for a user, such as an employee of a Registry, to create a new domain according to one embodiment. The method 400 begins by receiving user input data via user interface 1080 of Domain Manager 1070. The Domain Manager 1070 employs the received data to define one or more of a domain name, domain services (svcs), domain features and domain policies of a new domain (step 410). The Domain Manager 1070 may be a software application running on a server, and may be configured to receive user data to define and create a new domain at any level, including a top-level domain (TLD) and a second-level domain (SLD). A new domain so defined may then be administered by the Registry 1010.

The domain svcs defined by the Domain Manager 1070 when a new TLD is being created may include a list of one or more Extensible Provisioning Protocol (EPP) objects and command-response extension Uniform Resource Identifiers (URIs). The EPP objects may be used to configure an EPP to facilitate secure communications between Registrars and a Registry.

URIs may be used to uniquely identify an object service or extension in XML. An object service or extension may be defined using an XML schema with a unique XML URI. By including a list of EPP objects and command-response extension URIs, an Account may know what objects and extensions a particular domain supports. For example, two versions of the DNSSEC extension may be supported. Both of the extensions could be supported or a single one, so by including the URI the Account may know what it can use with a domain.

When a new SLD is being created with the Domain Manager, the Domain Manager may also define domain svcs to determine which TLDs are appropriate, based on the defined domain svcs.

The domain features defined by the Domain Manager when a new TLD is being created may include an identifier indicating whether the TLD is "thick" or "thin." With a thick TLD, contact information is required for domains, whereas with a thin TLD, contact information is not supported.

The domain features defined by the Domain Manager when a new TLD is being created may further include an identifier indicating whether the TLD supports internationalized domain names. An internationalized domain name allows for the use of characters from non-English languages, such as Chinese, Hindi, Arabic, Russian, or languages that use Latin diacritical characters.

The domain features defined by the Domain Manager when a new TLD is being created may further include an identifier indicating whether domain name system security extensions (DNSSEC) are supported and, if so, which version is supported. DNSSEC 1.0 defined in RFC 4310, DNSSEC 1.1 defined in RFC 5910, or both may be supported. In addition, policies such as whether the DS Data Interface or Key Data Interface is supported in RFC 5910 and what algorithms are supported can be defined.

The domain features defined by the Domain Manager when a new TLD is being created may further include a list of levels supported by the TLD. For example the list of levels may indicate "2" for second level support and "3" for third level support.

The domain policies defined by the Domain Manager when a new TLD is being created may include policies for a specific domain label, by level. For example, the policies regarding the specific domain label may include information, for each level (i.e., top-level domain, second-level domain, third-level domain, etc.), regarding one or more of: a minimum number of characters, a maximum number of characters, a requirement for the label to start with an alphanumeric character, a requirement for the label to end with an alphanumeric character, or a requirement that only DNS characters (upper and lower case Latin characters, numbers, and a hyphen) be supported.

In addition, the domain policies defined by the Domain Manager when a new TLD is being created may further include information regarding the minimum number of name servers required and/or the maximum number of name servers.

In addition, the domain policies defined by the Domain Manager when a new TLD is being created may further include a list of contact types, such as a registrant, an administrator, a technology contact, or a billing contact, and whether they are required or optional.

In addition, the domain policies defined by the Domain Manager when a new TLD is being created may further include DNSSEC policies. The DNSSEC policies may include the minimum number of delegation signer (DS) resource records in the case of a thin DNSSEC TLD or the minimum number of DNSKEY in the case of a thick DNSSEC TLD. The DNSSEC policies may also include the maximum number of delegation signer (DS) resource records in the case of a thin DNSSEC TLD or the maximum number of DNSKEY in the case of a thick DNSSEC TLD. A "thick" DNSSEC TLD may support the Key Data Interface of RFC 5910 and a "thin" DNSSEC TLS may support the DS Data Interface of RFC 5910.

In addition, the domain policies defined by the Domain Manager when a new TLD is being created may further include authorization information format policies. The authorization information format policies may include one or more of a minimum length, a maximum length, an indication of whether a numeric character is required, an indication of whether an alpha character is required, or an indication of whether a special character is required.

In addition, the domain policies defined by the Domain Manager when a new TLD is being created may further include information regarding what elements are not returned on a partial information response for non-sponsoring Accounts. If a querying Account is not the sponsoring Account (a sponsoring Account being a Registrar or Registry Internal Account that created the domain) and the Account does not provide valid authorization information, such as a private password that the Registrar may provide, server policy determines which optional elements are returned.

The domain policies defined by the Domain Manager when a new TLD is being created may further include one or more minimum registration periods with a command attribute to indicate commands, such as create, renew, or transfer, to which a given minimum registration period applies.

The domain policies defined by the Domain Manager when a new TLD is being created may further include one or more maximum registration periods with a command attribute to indicate commands, such as create, renew, or transfer, to which a given maximum registration period applies.

A new SLD may be created with the Domain Manager in the same way as a TLD. A domain label may be specified (that is, TLD or SLD) along with the domain features and policies, in order to create a TLD or a SLD. An SLD created with the Domain Manager would show similarly to a TLD, except a SLD would allow registration of third level domains, whereas a TLD would allow registration of second level domains.

Once the Domain Manager has defined one or more of a domain name, domain svcs, domain features and domain policies of a new domain (step 410), one or more databases at the Registry may be updated with some or all of the defined data (step 420). In some embodiments the Domain Manager will be located within the Registry. In embodiments where the Domain Manager is located within the Registry, the data acquired by the user interface of the Domain Manager may be transmitted to databases at the Registry using, for example, an intranet.

In some embodiments, the Domain Manager may be accessed by an internal Domain Manager User Interface to allow Registry administrators to create, update, and delete domains. In some embodiments, the Domain Manager may also, or alternatively, be access by an external Domain Manager User Interface to allow entities external to the Registry to create, update and delete domains. In some embodiments, such external entities may be limited to making information queries (i.e., read operations).

When a new domain is being created using the Domain Manager, a NameStore Customer Console (NCC) database in the Registry may be updated to include additional product information such that the new domain is an available product (step 420). The update of the NameStore Customer Console database may be performed when the domain is deployed. In addition, when a new domain is being created using the Domain Manager, the Registry may update a Consolidated Top Level Domain database in the Registry to include pricing data and other associated metadata regarding the new domain (step 420). The pricing data could include, for example, a price or a range of prices to be charged for registering a SLD under a new TLD. Updating of the Consolidated Top Level Domain database may be controlled by the Domain Manager, and may be performed when the new domain is deployed.

After the Registry has updated its databases with some or all of the data defined by the Domain Manager (step 420), some or all of the data regarding the new domain may be transmitted or otherwise made available over one or more communication channels to one or more downstream components of the DNS system external to the Registry (step 430). Alternatively, such availability may be provided concurrently with the updating of the one or more databases at the Registry. Data regarding a new domain may be made available to channels and downstream components based upon pre-agreed upon database tables that can be queried by the downstream components. The resolution services generally include versions of the contents of the Provisioning database including domain metadata. Using the domain metadata, the downstream components may be written to be data driven. The channels may include one or more Extensible Provisioning Protocol (EPP) channels (for example, a single EPP channel per Registry database). The downstream components may include one or more of DNS, Whois, Reports, and Data Escrow.

It will also be appreciated that, in addition to being used to introduce a new domain, the Domain Manager could be used to provide updates to one or more of a domain name, domain svcs, domain features, and domain policies of a previously registered domain. Changes to data stored in the various systems regarding the previously registered domain may propagate through the various systems in substantially the same manner as data regarding a new domain.

FIG. 5 depicts an example of a user interface of a Domain Manager according to one embodiment. In the embodiment depicted in FIG. 5, a table 520 will be displayed with a variety of information regarding domains that have been previously been created using the Domain Manager. For example, the table 520 may include a TLD name, a product prefix, and a current status of the creation process for TLDs that have been previously created. In the embodiment depicted in FIG. 5, an add domain button 510 may also be provided on the display that initiates the process for creating a new domain.

FIG. 15 depicts an example of a user interface of a Domain Manager according to one embodiment, where the creation process of a new TLD may begin. For example, the display depicted in FIG. 15 may be output after a user has selected button 510. A user may be given the option, or may be required, to configure a variety of settings for the new TLD. Once the user has finished selecting the options presented on the display, a user may be required to select a create domain button 1510. Upon selection of button 1510, new domain settings may begin to propagate, for example, to the Registry, Registrars and/or Resolution Services as described above with reference to FIG. 4.

Figure 6:
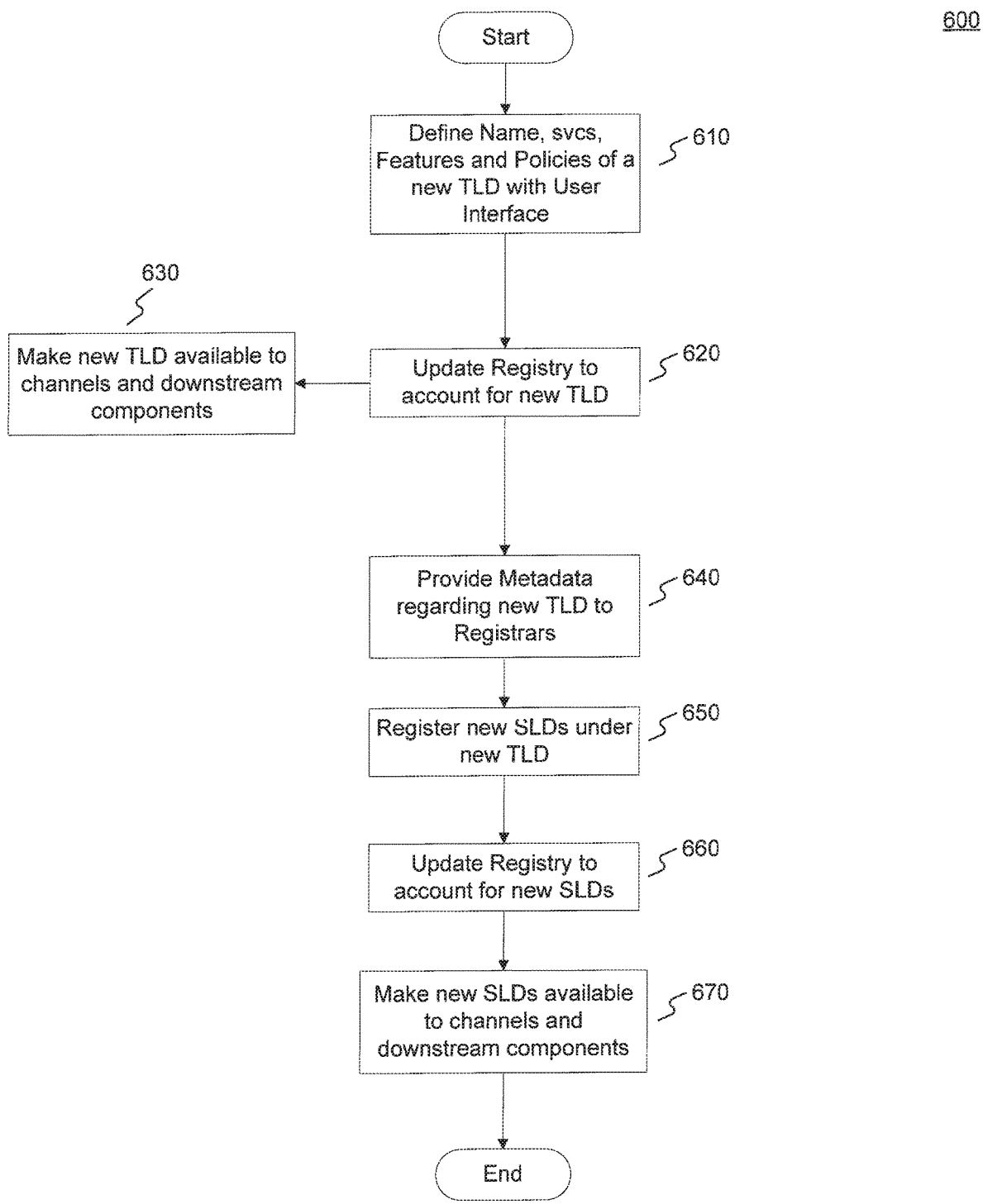
FIG. 6 is a flow chart of a top-level and second-level domain registration method for a new domain according to one embodiment.

FIG. 6 depicts a new TLD and SLD registration method 600 according to one embodiment. Whereas FIG. 4 depicts a method of registering any domain using the Domain Manager, FIG. 6 depicts a method where the Domain Manager is used to create a TLD, with SLDs subsequently registered under the TLD. The method 600 begins by receiving user input at a user interface of a Domain Manager. The user input includes data to define one or more of a domain name, domain svcs, domain features and domain policies of a new TLD using the user interface (step 610), in substantially the same manner as described above with respect to step 410 of FIG. 4.

After receiving the user input (step 610), one or more databases at the Registry may be updated with the acquired information (step 620), in substantially the same manner as step 420 of FIG. 4. After the Registry has updated its databases with the new data, or concurrently therewith, data regarding the new TLD may be made available over one or more channels to downstream components (step 630), in substantially the same manner as step 430 of FIG. 4.

After the Registry has updated its databases, or concurrently therewith, data regarding the new TLD may also be made available to one or more Registrars (step 640). It will be recognized that while in some embodiments the Registry and the one or more Registrars will represent separate systems, in other embodiments, such as a managed DNS service scenario, the Registry and Registrar functions will be within the same system.

Once the one or more Registrars have obtained the data regarding the new TLD, data may be received from the one or more Registrars to begin the registration process for one or more new SLDs under the TLD (step 650). Whereas the TLD may be managed by the Registry, new SLDs registered under the TLD may be managed by the customers registering the respective new SLDs or may be managed by a Registrar. Alternatively, if the Domain Manager were used to register new SLDs under the new TLD, the registered SLDs could also be managed by the Registry.

A Registrar may determine which SLDs to register under a TLD. Data regarding the new SLDs determined by a Registrar may be transmitted to the Registry, whereby the Registry will store the data regarding the new SLDs in one or more databases (step 660). For instance, the Registry may update a Provisioning Database to include the new SLDs, whereby the Provisioning Database stores data regarding some or all of the SLDs registered under a TLD. After the Registry has updated its databases to account for the one or more new SLDs, or concurrently therewith, the data regarding the new SLDs may be made available to each of several channels and to downstream components (step 670).

While FIG. 6 depicts a TLD being registered using the Domain Manager and an SLD then being registered below the TLD, it is to be appreciated that any level domain (e.g., a second-level domain, third-level domain, etc.) could be registered using the Domain Manager, and subsequently a domain could be registered one level below the domain registered via the Domain Manager.

Figure 7:
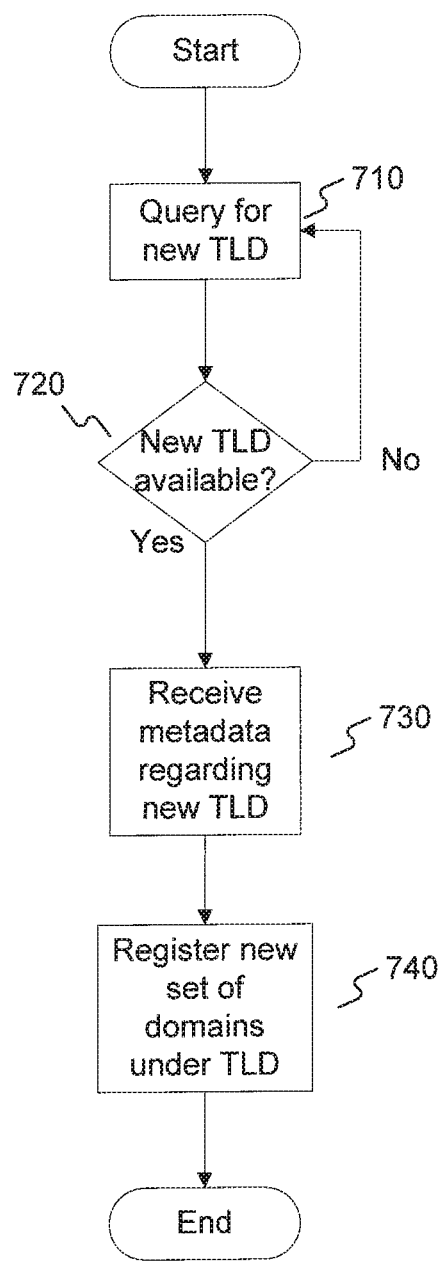
FIG. 7 is a flow chart of a registration method for a new second-level domain according to one embodiment.

FIG. 7 depicts a second-level domain registration method 700 of a new TLD according to one embodiment. Prior to the start of the method 700, a new TLD will have been created. The method begins by having one or more Registrars query a Registry as to whether a new TLD is available (step 710). The querying may be accomplished via a single virtual IP to which the one or more Registrars may connect. More details on using a virtual IP to implement the querying process may be found in U.S. patent application Ser. No. 12/543,462, published as U.S. Patent Application Publication No. 2011/

0047292, the subject matter of which is incorporated herein by reference. In performing the query, a Registrar may request an immediate response from the Registry. Alternatively, the Registry may place the Registrar's request in a queue and only respond to the Registrar's request when a new TLD has become available.

Once it is determined that a new TLD is available (step 720), the Registrar making the query will receive data regarding the new TLD (step 730). Using the received data, the Registrar may then begin the registration process for a new set of SLDs under a TLD (step 740) in substantially the same manner as steps 640-670 of FIG. 6.

Figure 8:
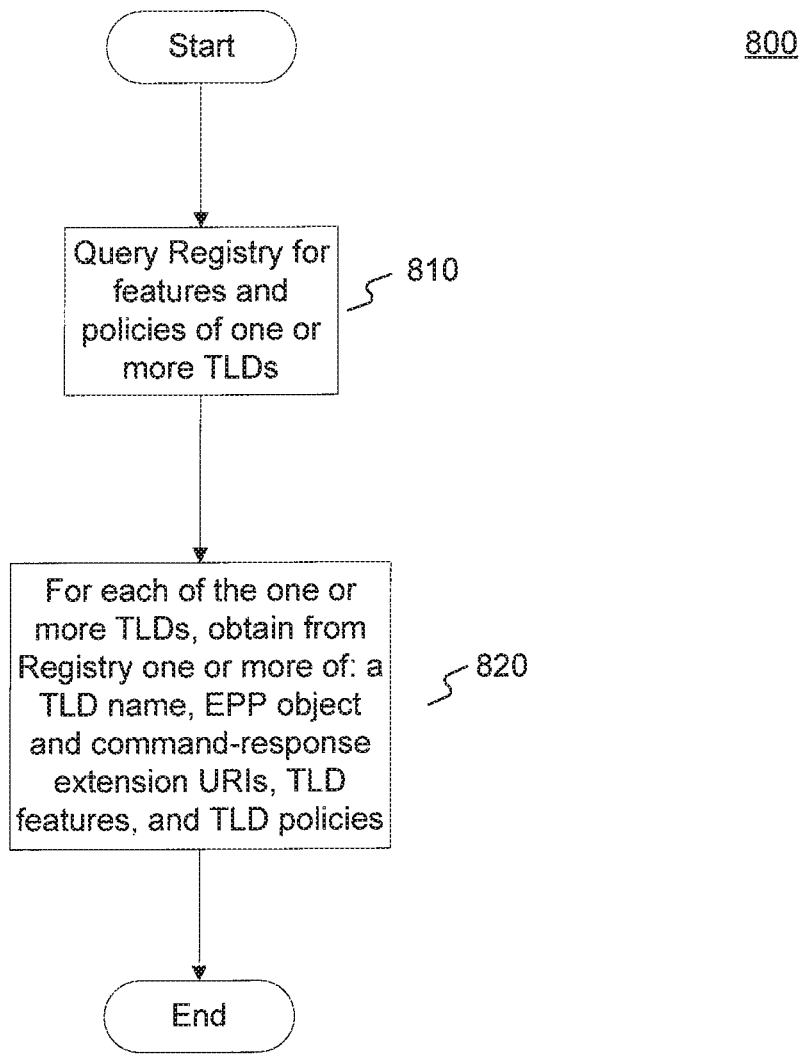
FIG. 8 is a flow chart of a domain feature and policy obtaining method according to one embodiment.

FIG. 8 depicts a domain feature and policy obtaining method 800 according to one embodiment. The method 800 depicts one example of an implementation for step 640 of FIG. 6. The method begins where a Registrar queries a Registry for data on one or more new TLDs (step 810). When the Registry receives the query and a new TLD is available, the Registry transmits to the Registrar one or more of: a TLD name, an EPP object and command-response extension URIs, TLD features, and TLD policies (step 820). The TLD name, EPP object and command-response extension URIs, TLD features, and TLD policies are substantially the same as those described in step 410 of FIG. 4. With the received data, the Registrar will be able to inform its customers of the name of the new TLD and the various characteristics (svcs, features and policies) of the new TLD. In addition, the received data will indicate to the Registrar what data it needs to acquire to register new SLDs under a new TLD.

Figure 9:
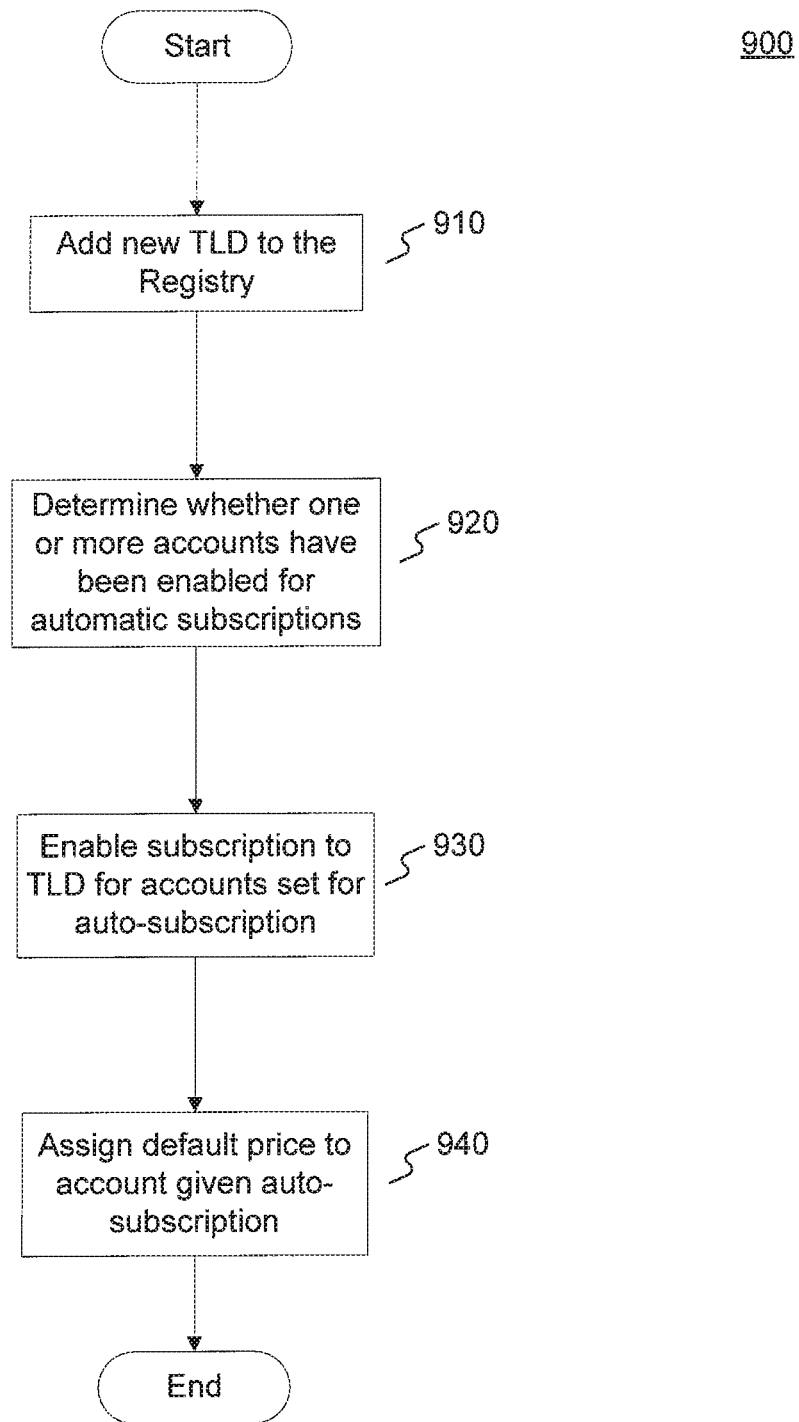
FIG. 9 is a flow chart of a second-level domain registration and pricing method according to one embodiment.

FIG. 9 depicts a second-level domain registration and pricing method 600 according to one embodiment. Prior to the start of the method 900, a new TLD will have been created. The method begins with a determination that a new TLD has become available (step 910).

Once it is determined that a new TLD has become available, a determination may be made as to whether one or more Accounts have been enabled for automatic subscriptions by searching a database at the Registry that contains such information (step 920). An Account enabled for automatic subscriptions may automatically start registering SLDs within the new TLD. Accounts that are not enabled for automatic subscriptions may be required to interact with a person at the Registry to create a TLD subscription before the Account can start registering SLDs within the new TLD. After determining which Accounts are enabled for automatic subscriptions, such Accounts may be automatically subscribed to a new TLD (step 930). Optionally, predetermined price bands will be stored that can be used to automatically determine a price to charge an Account for making use of the automatic subscription to the new TLD (step 940).

Figure 10:
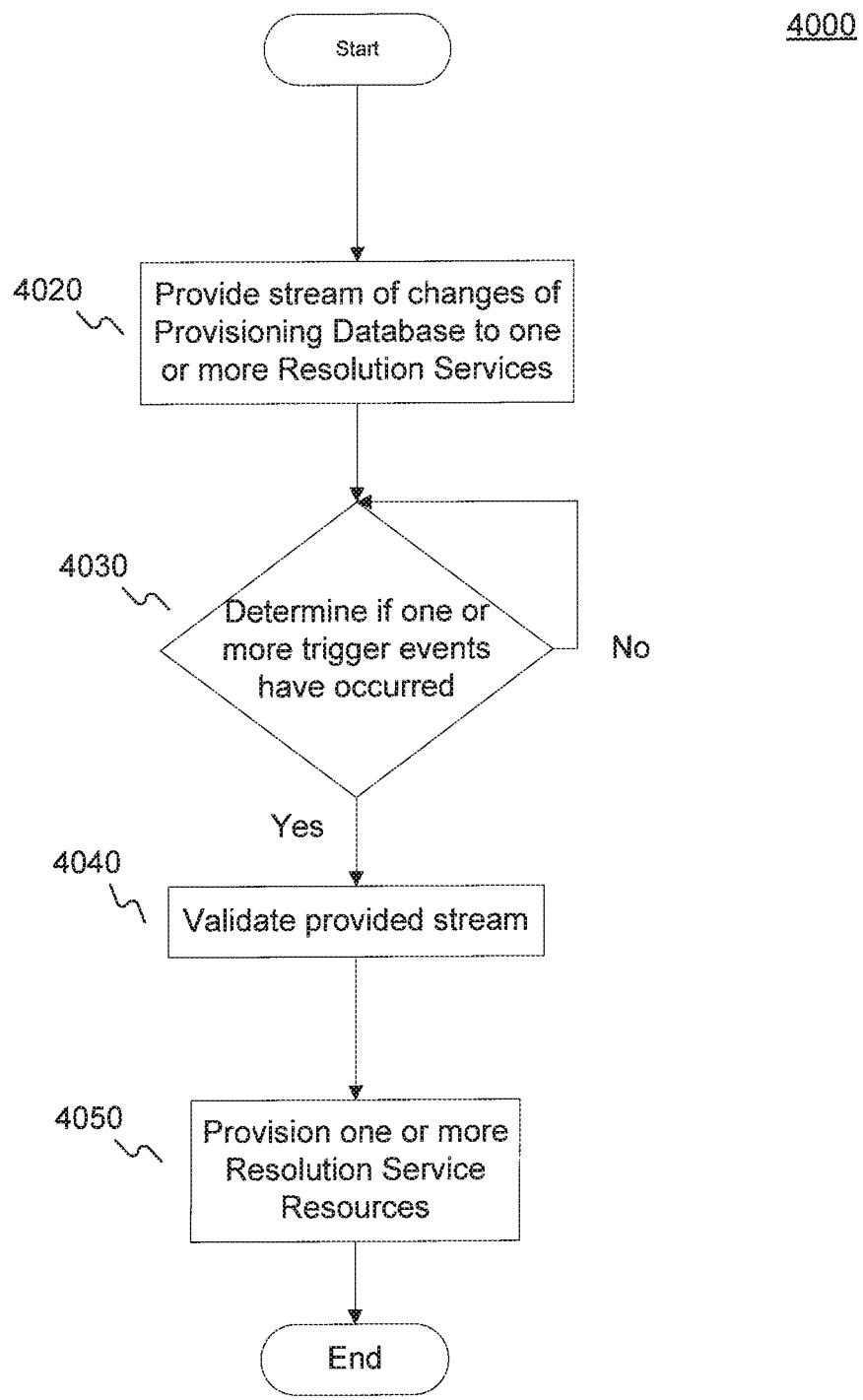
FIG. 10 is a flow chart of a Resolution Services enablement method according to one embodiment.

FIG. 10 depicts a Resolution Services enablement method 4000 according to one embodiment. The method begins by providing a stream of changes of the Provisioning Database to one or more Resolution Services located external to the Registry (step 4020). The stream may be transformed in a format useful to the target service.

A determination may then be made as to whether one or more trigger events have occurred (step 4030). The one or more trigger events at step 4030 may include, for example, a population of data in the Provisioning Database exceeding a certain threshold, a TLD being added, a TLD being updated, and a TLD being deleted. If one or more trigger events have occurred, the stream will be validated to ensure that there is no issue with the stream of transactions coming from the Provisioning Database to the Resolution Service (step 4040). Validation may include comparing the transformed data with the source data. Validation may be handled by the Resolution Service. The Resolution Service may extract the desired provisioning data from the stream, transform the data, validate the data, and propagate the data to resolution servers (e.g., DNS servers and/or Whois servers). The resolution servers generally have in-memory images of the transformed data with the provisioning database as the authoritative source.

After the stream is validated at step 4040, one or more Resolution Service Resources will be provisioned (step 4050). Provisioning of one or more Resolution Service Resources may include new TLD Servers and Whois Servers being setup, initialized, or updated. For example, a model may be setup to automatically allocate new resources or automatically enable new services in a Resolution Services Cloud for use by a new gTLD.

Figure 11:
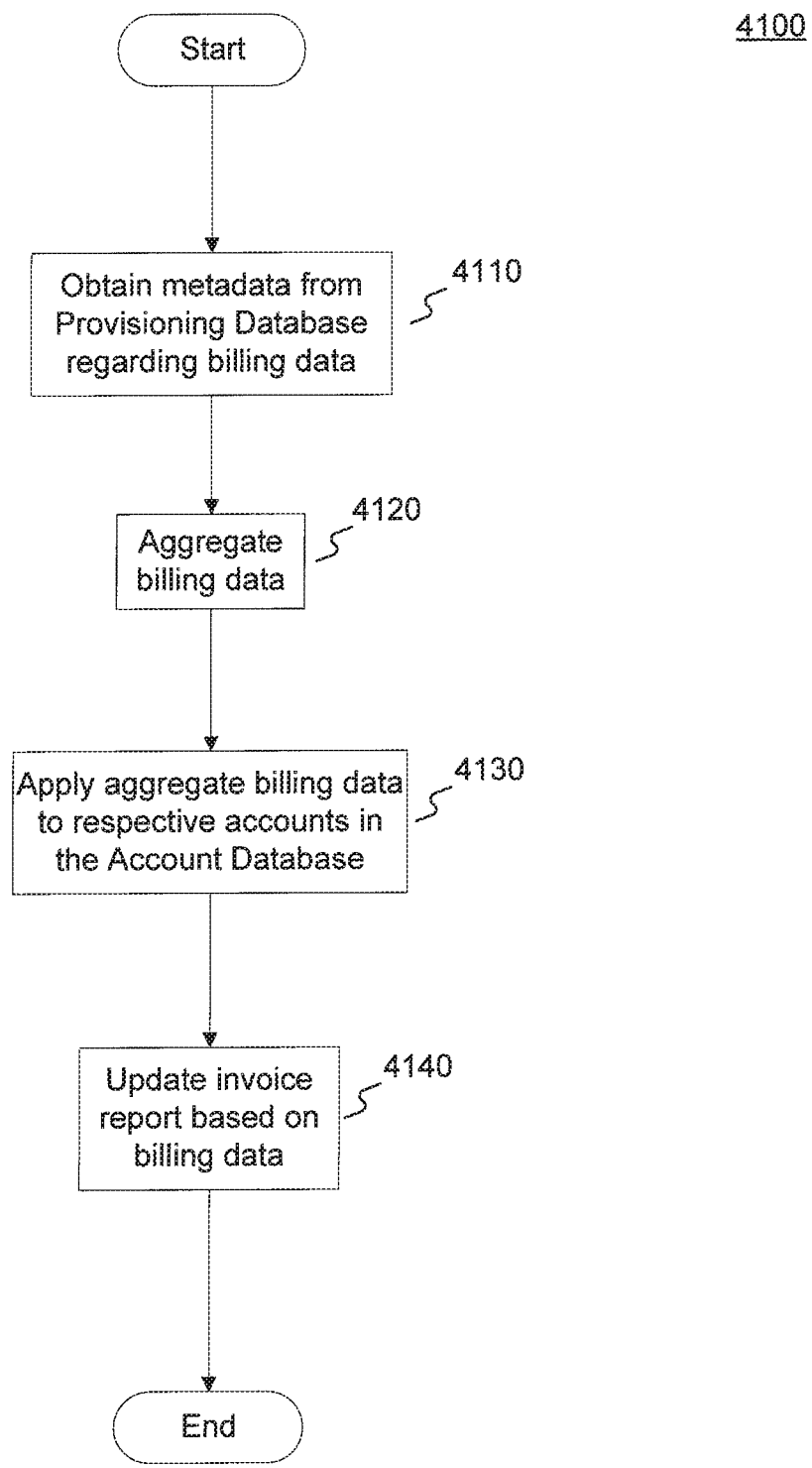
FIG. 11 is a flow chart of a billing and invoicing method according to one embodiment.

FIG. 11 depicts a billing and invoicing method 4100 according to one embodiment. The method begins by obtaining billing data from the Provisioning Database (step 4110). The billing data represents amounts that have been charged to Accounts for the registration of SLDs under a given TLD. The billing data will be aggregated into aggregate debits and credits that are applied to a given Account (step 4120). After aggregating the billing data, the aggregate billing data may be applied to respective Accounts in the Account database (step 4130). Optionally, an Update Available Credit component may control the billing when a new TLD application is deployed. After the billing data is processed, an invoice report may be updated (step 4140). The invoice report may dynamically add a new TLD based on the metadata and the billing data populated in the Provisioning Database.

A variety of entities, such as the Registry, the Registrars, and ICANN, may require the generation of reports. The Domain Manager may populate data in the Provisioning Database that may trigger the generation of reports providing information regarding domains, including TLDs and SLDs, that have been registered.

Figure 12:
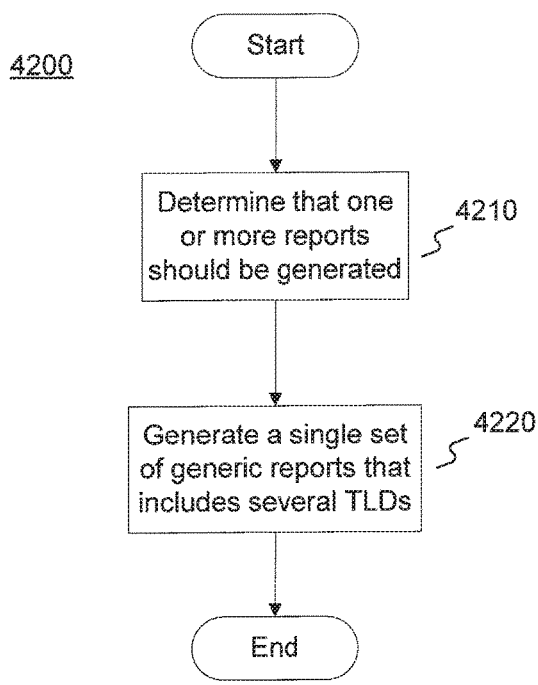
FIG. 12 is a flow chart of a report generating method according to one embodiment.

FIG. 12 depicts a report generating method 4200 according to one embodiment. The method begins by determining that one or more reports should be generated (step 4210). Upon such a determination, a single set of generic reports may be generated that includes several TLDs (step 4220). In such an embodiment, the single set of reports would be data-driven based on what is populated in the Provisioning Database.

Figure 13:
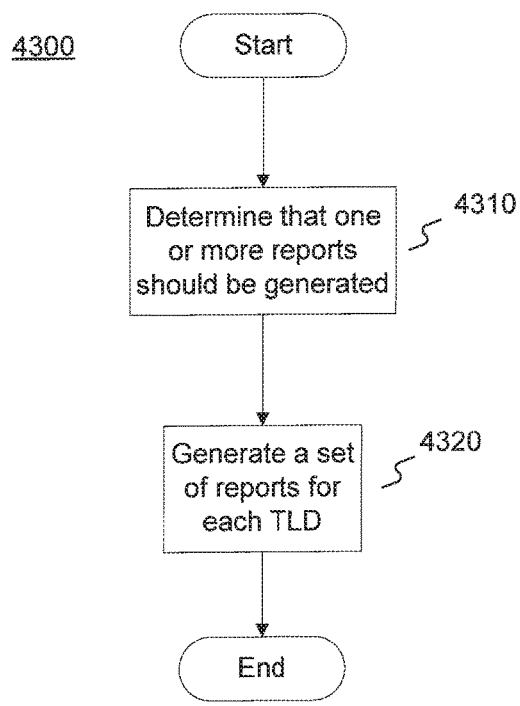
FIG. 13 is a flow chart of a report generating method according to one embodiment.

FIG. 13 depicts a report generating method 4300 according to another embodiment. The method begins by determining that one or more reports should be generated (step 4310). Upon such a determination, a set of reports may be generated for each TLD (step 4320). The set of reports may be made available on an FTP server, whereby a TLD sub-directory may be created in the FTP server based on the TLD name under a pre-defined parent directory.

Figure 14:
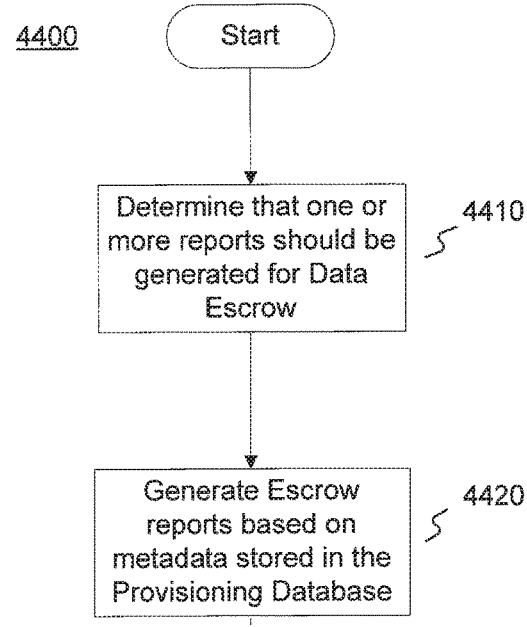
FIG. 14 is a flow chart of a report generating method according to one embodiment.

FIG. 14 depicts a report generating method 4400 according to one embodiment. The method begins by determining that one or more reports should be generated for Data Escrow (step 4410). Upon such a determination, Escrow reports may be generated based on metadata stored in the Provisioning Database (step 4420). In addition, a target escrow agent may also be optionally generated based on metadata stored in the Provisioning Database when more than one available escrow agent may be chosen. Once the Escrow reports are generated, the Escrow reports may be propagated to the Escrow Agent (step 4430). The propagation may occur using a template-based approach where the TLD specific escrow deposits are partitioned by a scheme having a TLD sub-directory or a TLD indicator in the file names so that the TLD specific escrow deposits may reside in a common directory. The format of the Data Escrow may be driven by the Domain Manager to allow multiple Data Escrow providers to be selected at the time that the TLD is created.

It will also be appreciated that one or more monitors may be provided by the Domain Manager. For example, one or more system health monitors may be provided that are implemented by looking for specific entries in logs, by driving off of data persisted to the database, or by query interfaces. The one or more system health monitors may identify error conditions and raise alerts in the event of errors. In addition, one or more real-time runtime metrics may be provided. The one or more real-time runtime metrics may increase visibility of the metrics of the running system. In addition, Service Level Agreement (SLA) monitors may be provided. The SLA monitors may measure availability and performance metrics of the systems to demonstrate how the systems perform to SLAs. The SLA monitors may be driven by Registry Information meta-data provided by the systems. In addition, the automated enablement of Registrar systems with the addition of a new TLD could also apply to the SLA monitoring, where the SLA monitors may query for the available TLDs, then query for the features and policies of the available TLDs to drive the SLA scenarios to run, and then execute the scenarios and send results in a generic form to generate combined or separated SLA reports.

The above described embodiments can be implemented using software, hardware, or a combination of hardware and software. The software may be stored on a memory, such as memory 1030, memory 1100, or memory 1130. Such memories may be RAM, ROM, hard disk, CD-ROM, DVD, flash drive, or any other computer readable medium capable of storing software. The software stored on a memory may be executed by a processor, such as processor 1020, processor 1090, or processor 1120, in order to implement the above described embodiments.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of creating a top level domain, comprising:
   receiving, at a first system, a request to create a non-existing top level domain as a top level domain in a registry in a domain name system (DNS), the request including domain data, the domain data comprising a domain name for the non-existing top level domain and a data definition defining one or more features to be supported by the non-existing top level domain, wherein the one or more features comprise at least one of:
      a thick indicator indicating that the non-existing top level domain is to be thick,
      a thin indicator indicating that the non-existing top level domain is to be thin, or
      an internationalized indicator indicating that the non-existing top level domain is to support internationalized domain names;
   creating a data structure comprising the domain data including the data definition; and
   transmitting a create domain request including the data structure to the registry in the DNS, wherein the registry creates, in response to the create domain request, the top level domain in the registry based on the data structure.

2. The method of claim 1, wherein a managed DNS service includes the registry.

3. The method of claim 1, further comprising:
   receiving, from the registry in response to the create domain request, data regarding the top level domain; and
   transmitting the data regarding the top level domain to a second system.

4. The method of claim 3, wherein the second system comprises a registrar.

5. The method of claim 3, wherein the second system comprises at least one of a DNS server or a Whois server.

6. The method of claim 1, further comprising:
   creating, via the registry, a second level domain one level below the top level domain.

7. The method of claim 6, wherein the creating the second level domain, via the registry, further comprises:
   determining that the top level domain has been created;
   identifying one or more accounts that are enabled for automatic subscription to domains; and
   adding one or more domains one level below the top level domain for at least one of the accounts enabled for automatic subscription.

8. The method of claim 1, further comprising transmitting the domain data regarding the top level domain to at least one of a DNS server, a Whois server, a data escrow server, a financial server, or a reporting server.

9. A system for creating a top level domain, comprising:
   a processor implemented at least in part in hardware and coupled to a memory;
   an input device at a first system, coupled to the processor, to receive a request to create a non-existing top level domain as a top level domain in a registry in a domain name system (DNS), the request including domain data, the domain data comprising a domain name for the non-existing top level domain and a data definition defining one or more features to be supported by the non-existing top level domain, wherein the one or more features comprise at least one of:
      a thick indicator indicating that the non-existing top level domain is to be thick,
      a thin indicator indicating that the non-existing top level domain is to be thin, or
      an internationalized indicator indicating that the non-existing top level domain is to support internationalized domain names;
   a data structure creation module coupled to the processor, for creating a data structure comprising the domain data including the data definition; and
   a communication module for transmitting a create domain request including the data structure to the registry in the DNS, wherein the registry creates, in response to the request to create, the top level domain in the registry based on the data structure.

10. The system of claim 9, wherein a managed DNS service includes the registry.

11. The system of claim 9, wherein the communication module receives, from the registry in response to the request to create, data regarding the top level domain and transmits the data to a second system.

12. The system of claim 11, wherein the second system comprises a registrar.

13. The system of claim 11, wherein the second system comprises at least one of a DNS server or a Whois server.

14. The system of claim 9, wherein the communication module transmits the domain data regarding the top level domain to at least one of a DNS server, a Whois server, a data escrow server, a financial server, or a reporting server.

15. A system for creating a top level domain, comprising:
a processor, implemented at least in part in hardware and coupled to a memory;
   a communication module, coupled to the processor, for receiving a request from a first system to create a non-existing domain as a top level domain in a registry in a domain name system (DNS), the request including a domain data structure that comprises a domain name for the non-existing top level domain and a domain data definition defining one or more features to be supported by the non-existing top level domain, wherein the one or more features comprise at least one of:
      a thick indicator indicating that the non-existing top level domain is to be thick,
      a thin indicator indicating that the non-existing top level domain is to be thin, or
      an internationalized indicator indicating that the non-existing top level domain is to support internationalized domain names;
one or more databases of a registry in the DNS for registering, in response to the request, the top level domain based on the domain data structure and storing at least some of the domain data definition; and
   a communication module, coupled to the processor, for transmitting data regarding the top level domain to one or more registrars, the data being transmitted including the domain data definition.

16. The system of claim 15, wherein a managed DNS service includes the registry.

17. The system of claim 15, wherein the communication module transmits the domain data regarding the top level domain to at least one of a DNS server or a Whois server.

18. The system of claim 15, further comprising:
one or more additional databases for storing data regarding one or more lower level domains one level below the top level domain.

19. The system of claim 15, wherein the communication module further receives data regarding one or more lower level domains one level below the top level domain to be registered under the top level domain from at least some of the one or more registrars.

20. The system of claim 15, wherein the communication module further transmits the domain data regarding the top level domain to at least one of a DNS server, a Whois server, a data escrow server, a financial server, or a reporting server.

21. The computer-implemented method of claim 1, wherein the receiving the request comprises receiving the request at the first system via a user interface.

22. The system of claim 9, wherein the system receives the request via a user interface.

23. The system of claim 15, wherein the system receives the request via a user interface.

* * * * *